United States Patent
Silverstein et al.

(10) Patent No.: US 11,630,867 B2
(45) Date of Patent: Apr. 18, 2023

(54) DATA EXHAUST LOGGING

(71) Applicant: KYNDRYL, INC., New York, NY (US)

(72) Inventors: Michael Seth Silverstein, Jacksonville, FL (US); Martin G. Keen, Cary, NC (US); Jeremy R. Fox, Georgetown, TX (US); Zachary A. Silverstein, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 102 days.

(21) Appl. No.: 17/461,041

(22) Filed: Aug. 30, 2021

(65) Prior Publication Data

US 2023/0067369 A1 Mar. 2, 2023

(51) Int. Cl.

| | | |
|---|---|---|
| *G06F 16/00* | (2019.01) | |
| *G06F 16/9035* | (2019.01) | |
| *G06N 20/00* | (2019.01) | |
| *G06F 16/17* | (2019.01) | |
| *G06F 16/9038* | (2019.01) | |
| *G06F 16/23* | (2019.01) | |

(52) U.S. Cl.
CPC ...... *G06F 16/9035* (2019.01); *G06F 16/1734* (2019.01); *G06F 16/2358* (2019.01); *G06F 16/9038* (2019.01); *G06N 20/00* (2019.01)

(58) Field of Classification Search
CPC .................................................. G06F 16/2358
See application file for complete search history.

(56) References Cited

U.S. PATENT DOCUMENTS

| | | |
|---|---|---|
| 5,335,343 A | 8/1994 | Lampson |
| 7,831,567 B2 | 11/2010 | Luther |
| 7,890,469 B1 | 2/2011 | Maionchi |
| 7,975,013 B2 | 7/2011 | Schmidt |
| 8,170,985 B2 | 5/2012 | Zimran |
| 9,843,586 B1 | 12/2017 | Feeser |
| 10,148,698 B2 | 12/2018 | Rao |
| 2002/0178146 A1 | 11/2002 | Akella |
| 2006/0123232 A1 | 6/2006 | Cannon |

(Continued)

OTHER PUBLICATIONS

"Creating Value Through Compliance Modernization," The Wall Street Journal, May 16, 2017, 7 pages. <https://deloitte.wsj.com/articles/creating-value-through-compliance-modernization-1494907334>.

(Continued)

*Primary Examiner* — Ajith Jacob
(74) *Attorney, Agent, or Firm* — Dan Housley; Andrew M. Calderon; Calderon Safran & Cole P.C.

(57) ABSTRACT

A machine learning model repeatedly scans data exhaust for workstations (for which there are retention requirements regarding data exhaust) over a period of time. The machine learning model analyzes the respective data exhaust and the retention requirements to determine respective data exhaust logging parameters for each workstation. The machine learning model monitors respective data exhaust activity for each workstation over a subsequent period of time. An instance is identified in which logging activity of data exhaust for an identified workstation fails the retention requirements. An ameliorative action designed to satisfy the respective retention requirements for the identified workstation is executed.

20 Claims, 3 Drawing Sheets

(56) References Cited

U.S. PATENT DOCUMENTS

2013/0227352 A1    8/2013   Kumarasamy
2020/0106637 A1*   4/2020   Jakobsson ........... H04L 12/2812
2021/0096957 A1    4/2021   Rahman

OTHER PUBLICATIONS

"Event Log Management for Security and Compliance," Progress Whats up Gold, accessed Aug. 30, 2021, 8 pages. <https://www.whatsupgold.com/resources/best-practices/event-log-management>.

"Proactive Workstation Monitoring with AIOps," Loom Systems, accessed Oct. 1, 2020, 7 pages. <https://www.loomsystems.com/solutions/proactive-workstation-monitoring>.

* cited by examiner

DATA EXHAUST LOGGING

BACKGROUND

Data exhaust is residual data that is (largely automatically) generated as a result of various computing activities. Data exhaust may be generated as a result of a user activities, such as activities relating to user-generated files. Examples of data exhaust includes cookies, temporary files, log files, or the like. In many instances organizations retain data exhaust for compliance reasons. For example, an organization may require that some types of data exhaust are logged for a certain period of time and refreshed at various rates, where the types of data exhaust, period of time, the refresh rate, or other logging variables are dependent upon various considerations of the organization.

SUMMARY

Aspects of the present disclosure relate to a method, system, and computer program product relating to data exhaust logging. For example, the method includes receiving retention requirements regarding data exhaust for a plurality of workstations. The method also includes repeatedly scanning, by a machine learning model, respective data exhaust for each of the plurality of workstations over a period of time. The method also includes determining, by the machine learning model analyzing the respective data exhaust and the retention requirements, respective data exhaust logging parameters for each workstation of the plurality of workstations. The method also includes monitoring, by the machine learning model, respective data exhaust activity for each workstation of the plurality of workstations over a subsequent period of time. The method also includes identifying an instance in which a manner that identified data exhaust is logged for an identified workstation of the plurality of workstations fails the retention requirements. The method also includes executing an ameliorative action designed to satisfy the respective retention requirements for the identified workstation. A system and computer program configured to execute the method described above are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
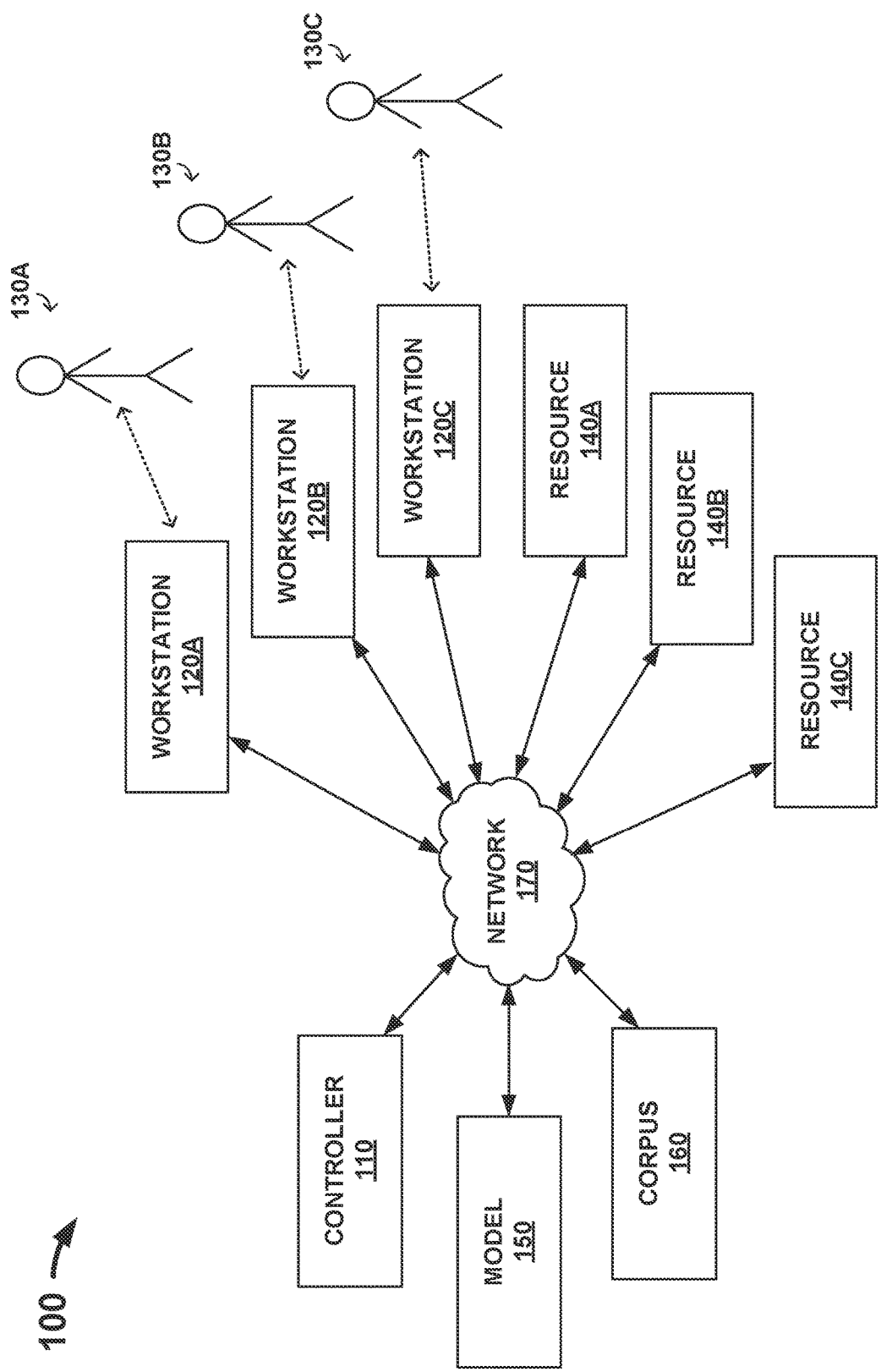
FIG. 1 depicts a conceptual diagram of an example system in which controller may manage the logging of data exhaust.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to logging data exhaust, while more particular aspects of the present disclosure relate to executing an ameliorative action in response to identifying that data exhaust logging activity does not satisfy data retention requirements. While the present disclosure is not necessarily limited to such applications, various aspects of the disclosure may be appreciated through a discussion of various examples using this context.

Many modern organizations look to track their data exhaust to be compliant with various data retention regulations/requirements (whether these regulations are internal or external to the organization). This data exhaust may include various log files that are generated as a result of various computing actions executed by a user. To be fully compliant with these retention requirements, an organization may need to keep records of various types/amounts of data exhaust in various manners, where the type/amount/manner of data exhaust logging may be dependent upon various variables that went into generated the data exhaust (e.g., the user that executed the action that generated the data exhaust, the workstation upon which the action was executed, a resource upon which the action was executed, etc.). In certain examples, an organization may additionally/alternatively need to store these records in predetermined locations (e.g., in a computing cloud or at an otherwise secure network location), store these records for some amount of time, and/or the organization may need to update logs of this exhaust data within certain time thresholds (e.g., via refresh rates) to comply with data retention requirements.

Organizations therefore use an array of conventional data exhaust logging systems that relate to collecting and/or storing this data exhaust. However, as modern enterprise environments get increasingly robust, it may be difficult to ensure that the proper level of data exhaust is gathered and stored at the correct locations for the correct amount of time. If data exhaust is not logged, then the organization may run into a situation where a computing event occurred where there is no data exhaust still maintained that explains it, such that it may be difficult to understand/debug/avoid that computing event in the present or in the future.

Some conventional data exhaust logging systems may look to "solve" this problem of the current state of data exhaust logging by using a brute force approach that stores all data exhaust of all computing workstations according to the most rigorous requirements of any workstation of the organization. While such a brute-force approach may be effective in storing the requisite data exhaust to satisfy the retention requirements, it may also be prohibitively expensive (e.g., both in terms of money and also in terms of computational resource allotment) to create and maintain a system that is configured to gather and store all of these records for all workstations at all times.

Other conventional data exhaust logging systems may look to solve this problem by being intensely configurable, such that an administrator (or an end-user) may go in set specific rules that define accurate data exhaust logging parameters for each given workstation. While such a conventional system may theoretically be able to configure workstations at a first moment in time to log data exhaust in a manner that complies with data retention requirements, such a rule-based system also is static. Thus, accounting for any update to the organization might be very user-intensive and therein error-prone, as it may require administrators to accurately identify how to change every relevant rule to account for any change to any retention requirement or workstation usage that satisfies all retention requirements for all workstations (which for large organizations may include tens of thousands of workstations). Therefore, even if such a conventional rule-based data exhaust logging system is correctly configured at one point in time, this conventional data exhaust logging system would rely on users updating the rules (or, arguably worse, the end data exhaust logging parameters on each workstation) to account for each new retention requirements or new unexpected workstation use. Therefore, conventional data exhaust logging systems lack a technical ability to keep data exhaust logging parameters in compliance in an autonomous fashion.

Aspects of this disclosure may solve or otherwise address some or all of these problems. For example, aspects of this disclosure relate to training an artificial intelligence (AI) model to understand relationships between retention requirements, data exhaust behavior, workstation usage, and the like, from which aspects of this disclosure determine appropriate data exhaust logging parameters (and therein execute ameliorative actions when an instance of data exhaust logging does not satisfy retention requirements).

A computing device that includes a processing unit executing instructions stored on a memory may provide the functionality that addresses these problems, this computing device herein referred to as a controller. This controller may, e.g., dynamically discover files with log-like behavior on each workstation of an organization, compare the log file refresh rate to the retention requirements that were determined by the controller for the workstation, identify a retention pathway via cloud or local backup for the workstation, and therein either generate reports on compliance or take ameliorative actions in response to non-compliance. While various types of data exhaust are explicitly mentioned and discussed herein, data exhaust as used herein may refer to any type of data that is created (e.g., "incidentally" created in the "background" of a computer) as a result of a user action that is consistent with this disclosure.

As described herein, the controller may include or otherwise utilize an AI machine learning (ML) model that has been trained to process file metadata to identify data exhaust (updates to log files, temporary files, uploaded metadata, or the like) that is associated with exhaust date retention requirements for that workstation. The controller may build and/or use a corpus related to data exhaust logging parameters, retention requirements, and the like, where the ML model uses this corpus in making various correlations, determinations, predictions, or the like. For example, this corpus may include data on expected and observed user-based, role-based, and/or activity-based data exhaust activity to determine correlations between data exhaust logging parameters and retention requirements.

The controller may execute autonomous ameliorative actions in response to detecting workstation activity that falls outside expected/determined retention requirements. As used herein, an action is "autonomous" where that action is executed without human intervention. Ameliorative cations may be executed in a substantially immediate fashion upon determination, such as the controller executing the ameliorative action within a few milliseconds or within a few computing cycles of identifying the ameliorative action. These ameliorative actions can include autonomously sending a message to one or more users identifying that there is an instance of workstation activity that did not satisfy a retention requirement. In some examples, the controller may execute an ameliorative action that includes autonomously changing one or more data exhaust logging parameters of a workstation. In certain examples, the controller may even detect an upcoming deletion of a data exhaust log file (or a portion of a data exhaust log file) that does not satisfy retention requirements, and may execute an ameliorative action of canceling/blocking this deletion operation to satisfy the retention requirements.

For example, there may be a situation where, e.g., an IT architect is utilizing a virtual private network (VPN) to access one or more resources on a client network. In such an example, the controller may use the ML model and/or corpus to analyze this accessing operation, analyze credentials associated with the IT architect, and analyze the one or more resources to identify expected data exhaust activity for this operation (e.g., log files and/or temporary files to be created, updated, deleted, etc.). Specifically, the controller may determine what the retention requirements of the organization require for this given situation. This may include the controller identifying what retention requirements correspond to one or more of: the specific user; an identified role of a user; the set of activities the user is looking to execute; or the like. For example, the controller may do so by analyzing comparable workstations used by similar users with similar roles executing similar activities (e.g., where this data is stored in the corpus).

To continue this example, the controller can then determine that data exhaust activity related to this IT architect using this particular VPN at a particular workstation to access these particular resources do not satisfy the retention requirements (e.g., indicating that the data exhaust parameters that govern the logged data exhaust activity do not satisfy the retention requirements). For example, the controller may determine that certain log files are scheduled to be deleted earlier than the controller would predict given this activity, indicating that this scheduled deletion is likely not in compliance of the retention requirements. Once the controller identifies that an action does not satisfy the retention requirements, the controller may execute an ameliorative action configured to address/fix the issue. The ameliorative action may include sending a notification to a user, extending the life of a log file (e.g., rather than letting it be deleted), or the like.

Figure 2:
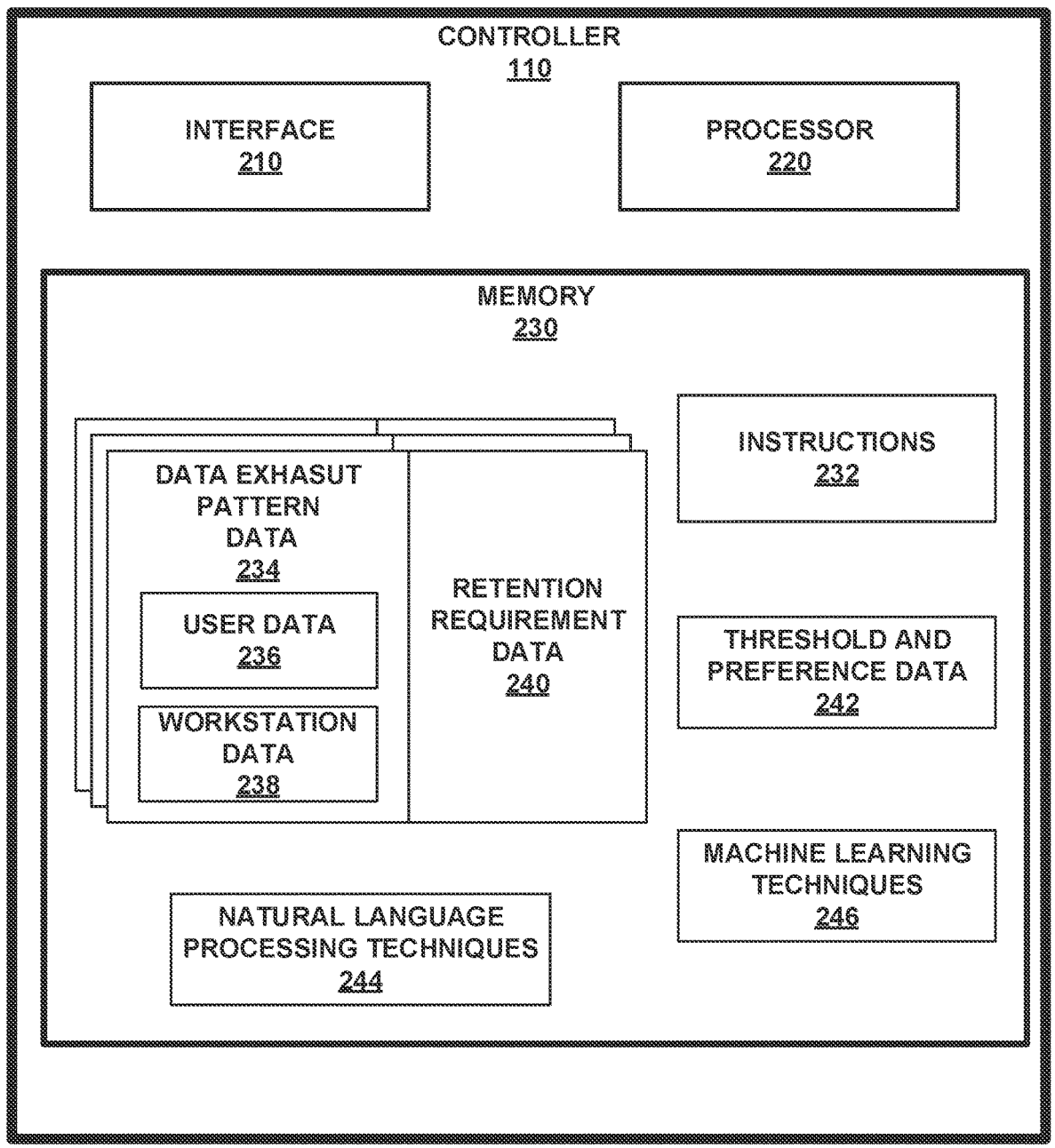
FIG. 2 depicts a conceptual box diagram of example components of the controller of FIG. 1.

For example, FIG. 1 depicts environment 100 in which controller 110 manages data exhaust logging as discussed herein. Controller 110 may include a processor coupled to a memory (as depicted in FIG. 2) that stores instructions that cause controller 110 to execute the operations discussed herein. Controller 110 may manage data exhaust logging of a plurality of workstations 120A-120C (collectively referred to herein as "workstations 120"). Workstations 120 may include individual computing systems, such as laptops, desktops, tablets, mobile devices, or the like.

Controller 110 may manage data exhaust logging of workstations 120 in relation to how workstations 120 are used by users 130A-130C (collectively referred to herein as "users 130") in accessing resources 140A-140C (collectively referred to herein as "resources 140"). Users 130 may be categorized by their association with an organization of controller 110 (e.g., a manager within the organization, a vendor for the organization, a client of the organization, an employee with a given title and/or role within the organization, or the like). Resources 140 may include anything for which controller 110 tracks access and/or usage, and/or anything for which controller 110 has identified as impacting data exhaust retention requirements as discussed herein. For example, resources 140 may include computing records, programming code, software applications, or the like. Accordingly, though resources 140 are depicted in FIG. 1 as standalone entities for purposes of illustration, resources 140 may be understood to be entities that are stored and/or hosted on one or more computing devices (e.g., such as one or more workstations 120, or servers of the organization).

Controller 110 may receive retention requirements regarding data exhaust for the organization. These retention requirements may be defined in myriad ways. For example, the retention requirements may detail one or two or more locations where data exhaust is required to be stored (e.g., whether locally on one of workstations 120, locally on another computer device, remotely on a cloud computing network, or the like), how long data exhaust is required to be stored (e.g., for a month after generation of the data exhaust, or one year after generation, or the like), a refresh rate of data exhaust logs (e.g., how often they receive new data), types of exhaust data to be stored, a level of detail of exhaust data to be stored, or the like. Further, the retention requirements may be controlled by various variables, such as which of resources 140 are being accessed, which of workstations 120 are being used to access the resources 140, which users 130 are using workstations 120 to access the resources 140, a time and/or location at which workstations 120 are being used to access resources 140, or the like.

Controller 110 may use a machine learning model 150 to manage data exhaust logging. For example, model 150 may be trained to learn correlations between data exhaust logging parameters (e.g., data exhaust logging settings such as where data exhaust records are to be saved and how long they are to be saved) and various retention requirements as it relates to various variables as described above. In some examples, model 150 may have access to corpus 160 of information on data exhaust and retention requirements from which model 150 may learn correlations. While controller 110, model 150, and corpus 160 are depicted as different entities within FIG. 1 for purposes of illustration, in certain examples some or all of model 150 and/or corpus 160 may be integrated into controller 110 (e.g., where all three are integrated into a single computing device such as the device of FIG. 2).

Corpus 160 may be a structured corpus 160, such that the data within corpus 160 is stored in a manner where correlations between retention requirements and logging parameters are stored in an organized manner (e.g., where various associates are tagged and/or weighted). This corpus 160 may include a mixed repository of data, such as public and/or private data gathered from the Internet, data gathered from historical databases of the organization, new data gathered by controller 110, or the like. Corpus 160 may include historical data (e.g., of the organization and/or of other similar organizations) of current and/or historical retention requirements and associated logging parameters of various historical workstations 120 and users 130. In some examples, corpus 160 may include current data that has been gathered from current workstations 120, users 130, and/or resources 140, and therein integrated in a structured manner into corpus 160 by controller 110 or a trained data scientist.

Model 150 may be trained (e.g., whether in a supervised or unsupervised manner) over time and via multiple scans of devices of environment 100 to understand go a given set of exhaust data activity correlates with the retention requirements based on the various variables involved in a given instance. For example, model 150 may learn that, based on a role of user 130A, retention requirements relating to user 130A accessing resource 140A via workstation 120A requires a first set of data exhaust logging parameters, whereas when user 130A accesses resource 140B via workstation 120B that a second set of logging parameters are required. Model 150 may learn how logging parameters are impacted by these various variables regarding users 130, workstations 120, resources 140, or the like. For example, model 150 may learn that the above sets of logging parameters apply to user 130A as a result of determining that user 130A has a similar role as user 130B, where these sets of logging parameters satisfy the retention requires when these logging parameters are apply to instances involving user 130B.

Once model 150 is trained, controller 110 may use model 150 to monitor behavior across organization. For example, controller 110 may monitor all logging behavior and resources 140 access over network 170. Network 170 may include a computing network over which computing messages may be sent and/or received. For example, network 170 may include the Internet, a local area network (LAN), a wide area network (WAN), a wireless network such as a wireless LAN (WLAN), or the like. Network 170 may comprise copper transmission cables, optical transmission fibers, wireless transmission, routers, firewalls, switches, gateway computers and/or edge servers. A network adapter card or network interface in each computing/processing device (e.g., computing devices that host/include controller 110, workstations 120, resources 140, model 150 and/or corpus 160) may receive messages and/or instructions from and/or through network 170 and forward the messages and/or instructions for storage or execution or the like to a respective memory or processor of the respective computing/processing device. Though network 170 is depicted as a single entity in FIG. 1 for purposes of illustration, in other examples network 170 may include a plurality of private and/or public networks.

Controller 110 may monitor past or current (e.g., real-time) behavior on network 170 in managing data exhaust logging. For example, controller 110 may intercept messages that are sent between workstations 120 and/or resources 140 on network 170 to monitor and manage data exhaust logging. The data exhaust that is monitored may be initially generated on any component of environment 100. For example, controller 110 may monitor data exhaust that is generated at workstations 120, a computing device of resources 140, or some other computing device of network 170. Controller 110 may monitor data exhaust logs of any number of computing devices of environment 100.

Controller 110 may detect instances in which logging parameters and/or activity do not match retention requirements. For example, controller 110 may detect that user 130C used workstation 120C to access resource 140C, and that data exhaust logs of this access are stored on workstation 120C and are scheduled to be deleted within a day. Controller 110 may use model 150 to analyze this logging activity (where the logging activity includes most or all of these variables) and identify that model 150 classifies this instance as requiring the data exhaust logs of this activity to be backed up at a remote location (e.g., a location on a cloud computing network) for an additional month.

In response to identifying instances in which logging activity fails the retention requirements in this manner, controller 110 may execute one or more ameliorative actions. For example, controller 110 may send a message to one or more administrators of environment 100, such as an email message, short message service (SMS) message, or the like. For another example, controller 110 may change one or more data exhaust logging parameters of one or more components of environment 100, such as a logging parameter that controls what data exhaust logs are saved, where the data exhaust logs are saved, where the data exhaust logs are saved, or the like. In certain examples, controller 110 may affirmatively act to override the deletion of logged data exhaust. For example, controller 110 may detect a message or upcoming scheduled action on network 170 to delete some data exhaust logs, in response to which controller 110 may stop the data exhaust log deletion, save the data exhaust log that is scheduled for deletion to a new location, or the like. Controller 110 may execute one or more of these ameliorative actions autonomously, such that the ameliorative action is executed without human action/interference. Controller 110 may execute one or more ameliorative actions autonomously in real-time upon detecting that past or upcoming logging activity fails one or more retention requirements. For example, controller 110 may detect (using model 150) logging activity that occurred a few milliseconds in the past (or is scheduled to occur a few milliseconds in the future), and may execute an ameliorative action within a few milliseconds of this detection (e.g., such that controller 110 executes the ameliorative action before a future activity occurs, despite this future activity being detected as being scheduled for deletion within milliseconds).

The controller 110 may then continue monitoring data exhaust logging activity and executing ameliorative actions in a pseudo-permanent and continual fashion. Controller 110 may further dynamically identify and account for any updates to environment 100, and respond accordingly. For example, controller 110 may detect new workstations 120 that are added to environment, new users 130 that begin using workstations 120, new resources 140 that are accessed via workstations 120, any retention requirements that are added/changed/deleted, or the like, and update model 150 such that these changes are accounted for during a subsequent analysis.

Where controller 110 detects such a change, controller 110 may use model 150 to determine how this change impacts various logging parameters and/or retention requirements. In response to controller 110 determining that such a change means that current data exhaust logging parameters do not satisfy the retention requirements, controller 110 may execute the ameliorative actions described herein so that the retention requirements may be satisfied.

An example of controller 110 responding to changes may include controller 110 detecting a new user 130B (e.g., via this new user 130B setting up a new username). In response to this detection, controller 110 may gather a role of this new user 130B, and identify other users 130 that have similar roles to user 130B, and then verify that logging parameters associated with this new user 130B satisfy retention requirements that correspond to the identified role of the new user 130B (updating the logging parameters if they do not). Another example of controller 110 dynamically responding to a change includes controller 110 detecting that a manner in which workstation 120C is used has changed (e.g., via detecting that a nature of the data exhaust of workstation 120C changing when compared to historical data exhaust of workstation 120C). In response to this detection, controller 110 may use model 150 to identify a set of logging parameters that correspond to this usage of workstation 120C (e.g., by comparing workstation 120C to historical records of other workstations 120 within corpus 160 that had similar usages). Yet another example of controller 110 responding to detecting changes includes controller 110 detecting that a single user 130A is associated with two workstations 120A, 120B that have different data exhaust logging parameters. In response to this detection, controller 110 may determine that one workstation 120A is known to currently satisfy the retention requirements (e.g., where the other workstation 120B is new to environment 100), such that controller 110 may change logging parameters of the other workstation 120B to match the workstation 120A known to be compliant. In these ways, controller 110 may be configured to dynamically react to changing patterns of data exhaust, workstation usage, and the like to continually monitor and verify retention requirement compliance.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with workstations 120, resources 140, model 150, corpus 160, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to monitor and manage data exhaust logging. Controller 110 may utilize processor 220 to manage data exhaust logging. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to monitor and manage data exhaust logging accordingly.

Processor 220 may manage data exhaust logging according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage data exhaust logging as described herein according to instructions 232 of one or more applications (e.g., software applications) stored in memory 230 of controller 110.

In addition to instructions 232, in some examples gathered or predetermined data or techniques or the like as used by processor 220 to manage data exhaust logging as described herein may be stored within memory 230. For example, memory 230 may include information described above that is gathered from workstations 120, model 150, and/or corpus 160. Specifically, as depicted in FIG. 2, memory 230 may include data exhaust pattern data 234, which itself includes user data 236 and workstation data 238, and memory 230 may also include retention requirement data 240.

Data exhaust pattern data 234 may include current data (e.g., from workstations 120) and/or historical data (e.g., from corpus 160). In some examples, data exhaust pattern data 234 may include the specific log files, temporary files, and the like. User data 236 may include identifying information on each user 130 that controller 110 may use to determine which user 130 is using a workstation 120. For example, user data 236 may include usernames or other such identifying information that may be used to uniquely identify users 130. In some examples, user data 236 also includes other data on users 130 such as the role of the users 130. In certain examples, controller 110 may gather an "opt-in" from each of users 130 prior to gathering any data on users 130, where this opt-in specifically details all information that user has agreed to allow controller 110 to gather. In such examples, controller 110 may store records of such opt-ins within user data 236. Further, workstation data 238 may include information such as the typical usages of workstations 120.

As depicted, sets of data exhaust pattern data 234 may be associated with sets of retention requirement data 240. For example, these associations may be correlations as stored within corpus 160 and/or learned/identified by model 150. Using these associations, controller 110 may identify a set of retention requirements of retention requirement data 240, and may therefore determine how this corresponds to specific instances of data exhaust, users 130, usage of workstations 120, and the like.

Further, memory 230 may include threshold and preference data 242. Threshold and preference data 242 may include thresholds that define a manner in which controller 110 is to manage data exhaust logging. For example, threshold and preference data 242 may include thresholds at which controller 110 is to execute various ameliorative actions, where, e.g., instances of a first severity are responded to with a message to an administrator, instances of a relatively greater severity are responded to with changing logging parameters, instances of a relatively greater severity still are responded to with autonomously overriding actions of environment (e.g., overriding deletions of data exhaust records), etc.

Memory 230 may further include natural language processing (NLP) techniques 244. NLP techniques 244 can include, but are not limited to, semantic similarity, syntactic analysis, and ontological matching. For example, in some embodiments, processor 220 may be configured to analyze natural language data of data exhaust or the like as gathered from workstations 120, corpus 160, and/or other devices or components of network 170 to determine semantic features (e.g., word meanings, repeated words, keywords, etc.) and/or syntactic features (e.g., word structure, location of semantic features in headings, title, etc.) of this natural language data. Ontological matching could be used to map semantic and/or syntactic features to a particular concept. The concept can then be used to analyze data exhaust patterns by finding files with names/titles associated with log tracking (e.g., names/titles such a error, log output) so that this data exhaust may be analyzed and managed as described herein.

Memory 230 may further include machine learning techniques 246 that controller 110 may use to improve a process of managing exhaust data logging as described herein over time. Machine learning techniques 246 can comprise algorithms or models that are generated by performing supervised, unsupervised, or semi-supervised training on a dataset, and subsequently applying the generated algorithm or model to manage data exhaust. Using these machine learning techniques 246, controller 110 may improve an ability of determining whether data exhaust logging is compliant with retention requirements, and/or executing appropriate ameliorative actions when data exhaust logging fails retention requirements. For example, controller 110 may identify over time certain types of ameliorative actions that are better or worse at bringing environment 100 to compliance with retention requirements quickly and consistently for various types of detected data exhaust patterns.

Machine learning techniques 246 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
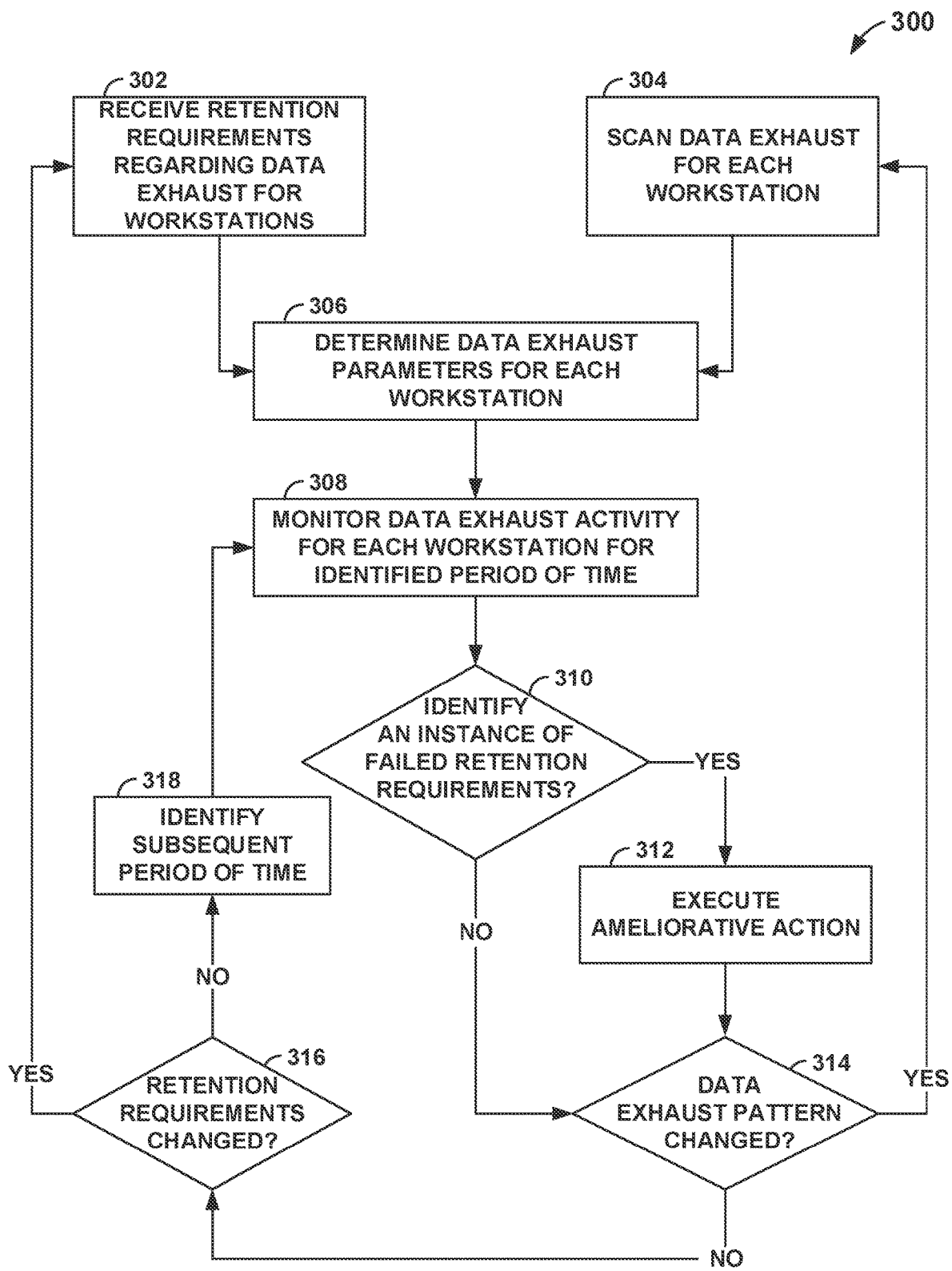
FIG. 3 depicts an example flowchart by which the controller of FIG. 1 may manage the logging of data exhaust.

Using these components, controller 110 may manage data exhaust logging as discussed herein. For example, controller 110 may manage data exhaust logging according to flowchart 300 depicted in FIG. 3. Flowchart 300 of FIG. 3 is discussed with relation to FIG. 1 for purposes of illustration, though it is to be understood that other environments with other components may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 receives retention requirements regarding data exhaust for a plurality of workstations 120 (302). Controller 110 may receive this via an initialization stage of controller 110, or via controller 110 gathering retention requirements from one or more repositories (e.g., a repository of the organization found on network 170). Controller 110 scans data exhaust for each of workstations 120 over a period of time (304). Controller 110 may repeatedly scan data exhaust of each of workstations 120 over this period of time to determine some data exhaust behavior such as a refresh rate and a data exhaust log duration (e.g., how long records are maintained for). Controller 110 may gather data exhaust from each of workstations, and provide this gathered data exhaust to machine learning model 150. Once controller 110 has received retention requirements and scanned data exhaust, controller 110 determines data exhaust logging parameters across environment 100 (306). For example, controller may determine required logging parameters for each workstation 120 of environment 100 such that each workstation 120 complies with the retention requirements. Controller 110 may cause model 150 to analyze the respective data exhaust and retention requirements to determine the logging parameters.

Controller 110 monitors for the aim of determining whether respective data exhaust activity for each of workstations 120 is compliant with retention requirements (308). Controller 110 may provide all gathered/intercepted data exhaust activity to model 150 for model 150 to analyze. As used herein, data exhaust activity includes data exhaust generation, data exhaust logging (including a location of this logging), data exhaust log deletion, or the like. Controller 110 may monitor data exhaust activity at a subsequent period of time in relation to the period of time during which controller 110 determined the data exhaust logging parameters (e.g., where model 150 was first trained/calibrated for environment 100 in a first period of time, and then model 150 analyzes data exhaust of environment 100 for compliance in the subsequent period of time).

Controller 110 determines whether or not an instance in which logging activity of data exhaust fails the retention requirements (310). Controller 110 may identify this instance as it relates to a specific identified workstation 120. For example, controller 110 may identify an instance where a certain type of data exhaust is not logged (where this type of data exhaust is supposed to be logged), an instance where a refresh rate of an exhaust data log is too low (e.g., below a predetermined refresh rate threshold that includes a certain number of refreshes over a given period of time), an instance where a log for some data exhaust is located at an improper location (e.g., locally versus remote), or the like. Where controller 110 does identify this instance (yes branch from 310), controller 110 executes ameliorative action (312). Controller 110 may execute this ameliorative action autonomously and/or substantially immediately (e.g., within a few processing cycles or milliseconds of identifying the instances of failed retention requirements at 310).

Whether or not controller 110 identifies an instance in which data exhaust activity fails the retention requirements (e.g., no branch from 310, or after 312), controller 110 may determine whether or not the data exhaust pattern has changed (314). This may include data exhaust changes that reflect things such as new users 130, new resources 140, changes to the usage of workstations 120, or the like. Where controller 110 detects such changes (yes branch from 314), controller 110 may cause model 150 to scan data exhaust for full environment 100 again (304) to update data exhaust parameters. Where controller 110 does not detect such changes, controller 110 may determine whether or not any retention requirements have changed (316). In response to controller 110 identifying a change to retention requirements (yes branch from 316), controller 110 receives new retention requirements (302) to update data exhaust parameters for full environment 100 as applicable. Where controller 110 determines that retention requirements have not changed (no branch from 316), controller 110 identifies a subsequent period of time (318) and again monitors data exhaust activity for this identified period of time (308). In this way, controller 110 may regularly (e.g., at periodic intervals/periods, such as once every minute, hour, day, etc.) scan and monitor data exhaust of environment 100, and update logging parameters in response to changes of data exhaust patterns and/or retention requirements.

For example, discussed below is one potential embodiment in which controller 110 could manage data exhaust logging. Controller 110 could start via an analysis of workstations 120, users 130, and resources 140. In this first phase, controller 110 could gather opt-ins from each user 130 via modules of controller 110 on respective workstations 120. Controller 110 may receive or otherwise gather the retention requirements, where this relates to data exhaust propagation requirements for the organization (e.g., where this data exhaust includes log files, temporary files, online reporting, or the like). Once these retention requirements are received, controller 110 repeatedly scans workstation devices 120 over a period of time (e.g., multiple days or weeks) to capture data exhaust behavior/patterns.

Specifically, controller 110 may identify data exhaust by crawling through workstations 120 to identify files that are indicative of data exhaust such as .log files or .txt files, therein using NLP techniques as described herein on natural language of these files to confirm whether these files are data exhaust (and, if so, analyze their contents). This may include using topic association techniques to identify files with names/titles that are associated with log tracking (e.g., names that include terms such as "error," "log," "output," or the like). Controller 110 may further search within these files for data that indicates log files and, upon identifying a file as a log file, index these files and the activity associated with them. For example, controller 110 may identify how long these files are maintained for and how frequently they are refreshed (e.g., where this is determined via the repeated scans in the initialization stage). Controller 110 also identifies the type of logging that was performed, where this includes a level of detail that is logged and identified portions of the log file that were modified.

Controller 110 may then analyze all of these gathered data to determine exhaust data logging parameters. For example, controller 110 determines logging parameters for files indicative of short-term retention (e.g., when these short-term files are schedule by time/date to be created, modified, and/or deleted). Controller 110 may further identify trends regarding how often log files are updated, how much content is added to a log file per update, what type of content is added to a log file, or the like, where each of these may relate to various retention requirements.

The managing of data exhaust logging may then enter into a second phase where this data exhaust activity is analyzed. For example, controller 110 may determine observations that relate to users 130, such as patterns of workstation 120 usage by users 130. This may include a frequency with which users 130 use workstations 120, the software applications that users 130 launch on workstations 120, the network activity performed by users 130, security permissions assigned to user 130, or the like. Controller 110 may build a "picture" of typical workstation 120 usage for a given user 130 in this way.

Controller 110 may further gather observations about workstations 120 based on roles of users 130. For example, controller 110 may identify patterns as to how workstations 120 are used by sets of users 130 that have similar roles as an identified user 130 that controller 110 is monitoring. Specifically, controller 110 may determine that user 130A is a client-facing IT architect working in a services department, and may therefore gather workstation 120 usage patterns from other users 130 with similar job roles.

Controller 110 may also gather observations about how workstations 120 are used. For example, controller 110 may identify computing tasks that are being executed on workstations 120 and compare these tasks to a corpus 160 that details similar tasks. This may include controller 110 detecting that user 130B is submitting a travel expense report, in response to which controller 110 considers activities that occur for other users 130 completing similar tasks.

Controller 110 may then execute a data exhaust analysis on some or all observations identified above using the data exhaust output for respective user 130 and the respective workstation 120. For example, controller 110 may determine whether the data exhaust file logging activity is consistent between users 130 with a given job role completing a given task. Where controller 110 determines that logging activity is inconsistent, controller 110 may determine that this activity has failed retention requirements. In response to determining that this activity has failed the retention requirements (e.g., by having a log frequency below a threshold, by having a volume of log data below a threshold, or by not including a type of data exhaust that is expected), controller 110 executes an ameliorative action.

This ameliorative action may include notifying the respective user 130 associated with the action of the retention requirement failure or notifying an organization of the respective user 130 of the retention requirement failure. In some examples, the ameliorative action may include programmatically extending the life of a file to ensure it meets logging retention requirements. For example, controller 110 may copy/capture the full log file and a portion of a "next" log file, combine these two log files together, and locally store them at a predetermined location. For another example, the ameliorative action includes the controller 110 initiating a backup of the log file that takes snapshots of the log files as needed.

In some examples, controller 110 may analyze retention activity for a given user 130C that uses multiple workstations by comparing log file retention parameters across each of these multiple workstations 120 operated by this single user 130C. Where controller 110 identifies differences between these retention parameters, controller 110 may flag these differences as noncompliant retention activity, therein taking ameliorative action as necessary.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving retention requirements regarding data exhaust for a plurality of workstations;
scanning, repeatedly and by a machine learning model, respective data exhaust for each of the plurality of workstations over a period of time;
determining, by the machine learning model analyzing the respective data exhaust and the retention requirements, respective data exhaust logging parameters for each workstation of the plurality of workstations;
monitoring, by the machine learning model, respective data exhaust activity for each workstation of the plurality of workstations over a subsequent period of time;
identifying an instance in which logging activity of data exhaust for an identified workstation of the plurality of workstations fails the retention requirements; and
executing an ameliorative action designed to satisfy the respective retention requirements for the identified workstation.

2. The computer-implemented method of claim 1, wherein the respective data logging parameters for each workstation of the plurality of workstations are based on how respective workstations are used.

3. The computer-implemented method of claim 2, wherein the machine learning model determines how respective workstations are used by analyzing the respective data exhaust.

4. The computer-implemented method of claim 2, wherein the machine learning model determines how respective workstations are used based on respective users that are associated with respective workstations.

5. The computer-implemented method of claim 2, wherein the machine learning model determines how respective workstations are used based on how a respective user uses two different workstations of the plurality of workstations.

6. The computer-implemented method of claim 5, wherein one of the two different workstations is known to satisfy the retention requirements.

7. The computer-implemented method of claim 1, wherein the ameliorative action includes autonomously changing a logging parameter relating to logging data exhaust for the identified workstation.

8. The computer-implemented method of claim 1, wherein the ameliorative action includes autonomously overriding the deletion of logged data exhaust.

9. The computer-implemented method of claim 1, wherein the ameliorative action includes causing some data exhaust logs to be backed up at a remote location.

10. The computer-implemented method of claim 1, wherein the retention requirements include types of data exhaust to be logged, a log refresh rate, a location of logs of data exhaust, and a time duration of log storage.

11. The computer-implemented method of claim 1, wherein the instance is selected from a group that consists of:
a type of data exhaust not being logged;
a refresh rate being too low for a threshold; and
a respective log of the identified data exhaust being located at an improper location.

12. A system comprising:
a processor; and
a memory in communication with the processor, the memory containing instructions that, when executed by the processor, cause the processor to:

receive retention requirements regarding data exhaust for a plurality of workstations;
scan, repeatedly and by a machine learning model, respective data exhaust for each of the plurality of workstations over a period of time;
determine, by the machine learning model analyzing the respective data exhaust and the retention requirements, respective data exhaust logging parameters for each workstation of the plurality of workstations;
monitor, by the machine learning model, respective data exhaust activity for each workstation of the plurality of workstations over a subsequent period of time;
identify an instance in which logging activity of data exhaust for an identified workstation of the plurality of workstations fails the retention requirements; and
execute an ameliorative action designed to satisfy the respective retention requirements for the identified workstation.

13. The system of claim 12, wherein the respective data logging parameters for each workstation of the plurality of workstations are based on how respective workstations are used.

14. The system of claim 13, wherein the machine learning model determines how respective workstations are used by analyzing the respective data exhaust.

15. The system of claim 13, wherein the machine learning model determines how respective workstations are used based on respective users that are associated with respective workstations.

16. The system of claim 13, wherein the machine learning model determines how respective workstations are used based on how a respective user uses two different workstations of the plurality of workstations.

17. The system of claim 16, wherein one of the two different workstations is known to satisfy the retention requirements.

18. The system of claim 12, wherein the ameliorative action includes autonomously changing a setting relating to logging data exhaust for the identified workstation.

19. The system of claim 12, wherein the ameliorative action includes autonomously overriding the deletion of logged data exhaust.

20. A computer program product, the computer program product comprising a computer readable storage medium having program instructions embodied therewith, the program instructions executable by a computer to cause the computer to:
receive retention requirements regarding data exhaust for a plurality of workstations;
scan, repeatedly and by a machine learning model, respective data exhaust for each of the plurality of workstations over a period of time;
determine, by the machine learning model analyzing the respective data exhaust and the retention requirements, respective data exhaust logging parameters for each workstation of the plurality of workstations;
monitor, by the machine learning model, respective data exhaust activity for each workstation of the plurality of workstations over a subsequent period of time;
identify an instance in which logging activity of data exhaust for an identified workstation of the plurality of workstations fails the retention requirements; and
execute an ameliorative action designed to satisfy the respective retention requirements for the identified workstation.

\* \* \* \* \*